(12) United States Patent
Brogårdh et al.

(10) Patent No.: US 6,425,303 B1
(45) Date of Patent: Jul. 30, 2002

(54) DEVICE FOR RELATIVE MOVEMENT OF TWO ELEMENTS

(75) Inventors: Torgny Brogårdh; Jan Smede, both of Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/486,487

(22) PCT Filed: Sep. 11, 1998

(86) PCT No.: PCT/SE98/01626

§ 371 (c)(1),
(2), (4) Date: Jun. 2, 2000

(87) PCT Pub. No.: WO99/14018

PCT Pub. Date: Mar. 25, 1999

(30) Foreign Application Priority Data

Sep. 12, 1997 (SE) .............................................. 9703307

(51) Int. Cl.⁷ .............................................. B25J 17/00
(52) U.S. Cl. ................................ 74/490.03; 248/278.1; 248/284.1; 414/917; 903/23
(58) Field of Search .................... 74/490.03; 248/278.1, 248/284.1; 414/917; 903/23

(56) References Cited

U.S. PATENT DOCUMENTS

| | | | | |
|---|---|---|---|---|
| 3,419,238 A | * | 12/1968 | Flory | .......................... 248/163 |
| 4,651,589 A | * | 3/1987 | Lambert | ....................... 74/469 |
| 4,976,582 A | | 12/1990 | Clavel | |
| 5,156,062 A | | 10/1992 | Appleberry | |
| 5,219,266 A | | 6/1993 | Reboulet et al. | |
| 5,237,887 A | | 8/1993 | Appleberry | |
| 6,047,610 A | * | 4/2000 | Stocco et al. | ............ 74/479.01 |
| 6,095,011 A | * | 8/2000 | Brogårdh | ................. 74/490.03 |
| 6,301,988 B1 | * | 10/2001 | Brogårdh | ................. 74/490.03 |

FOREIGN PATENT DOCUMENTS

| | | |
|---|---|---|
| EP | 0 127 895 | 12/1984 |
| SE | 502 256 | 9/1995 |
| WO | WO 95/11780 | 5/1995 |
| WO | WO 97/33726 | 9/1997 |

* cited by examiner

*Primary Examiner*—David Fenstermacher
(74) *Attorney, Agent, or Firm*—Connolly Bove Lodge & Hutz, LLP; Larry J. Hume (57) ABSTRACT

A robot for movement of a moveable element (2) relative to a base element (1) comprises at least two link devices (4, 5, 6) coupled between the elements. These link devices comprise each at least two mutually articulated link units (7, 8; 9, 10; 11, 12) and power exerting arrangements (13, 14, 15) adapted to pivot the link devices for changing the relative position of the elements. A first (4) of the link devices is connected with the moveable element (2) via a hinge connection (16) so that there are, on consideration of the robot in its entirety, at least two degrees of freedom in the form of relative pivotability about two pivot axes, real or imaginary, extending at an angle relative to each other between the first link device (4) and said element (2). A further (5) of the link devices is connected to the base element (1) via a hinge connection (32, 33, 28) which on consideration of the robot in its entirety provide for freedom of movement between the further link device (5) and the base element (1) with respect to at least two degrees of freedom consisting of pivotability about two different pivot axes, real or imaginary.

37 Claims, 9 Drawing Sheets

DEVICE FOR RELATIVE MOVEMENT OF TWO ELEMENTS

FIELD OF THE INVENTION

This invention is related to a device for relative movement of two elements, one of which forms a base element whereas a second is movable relative to the base element, comprising at least two link devices coupled between the elements, said link devices each comprising at least two mutually articulated link units, and power exerting arrangements adapted to cause the link devices to pivot for changing the relative position of the elements, a first of the link devices being connected to one of the elements via a hinge connection so that there are, on consideration of the device in its entirety, at least two degrees of freedom between said first link device and said element in the form of relative pivotability about two pivot axes, real or imaginary, placed at an angle relative to each other.

The relative movement of the two elements has the purpose to position them mutually in a manner aimed at by means of the power exerting arrangements. More specifically, the device according to the invention is intended to form a manipulator or robot. The moveable of the elements is intended to carry, directly or indirectly via a carrying arrangement, a working member to execute the function aimed at.

BACKGROUND OF THE INVENTION

A robot is described in U.S. Pat. No. 4,976,582. For the positioning of the second element, the known robot comprises three power exerting arrangements, which comprise three power exerting members arranged in a triangular distribution on the first element. Each of the power members is connected to the moveable second element via its own connection comprising a link device each comprising at least two mutually articulated link units. First link units hingedly connected to the first link unit and to the second element respectively via connections providing, on consideration of the device in its entirety, two degrees of freedom.

A disadvantage with this known type of robot is that it becomes comparatively bulky as a consequence of the triangular distribution discussed herein above. Furthermore, it is structurally difficult to design the known robot with the required flexibility concerning working area and movement area since the first link units project in a star shaped manner from the first element.

OBJECT OF THE INVENTION

The invention primarily aims at devising routes to develop the device of the kind defined by way of introduction so as to eliminate or at least reduce one or more of the disadvantages mentioned herein above, a particular aim being to provide a great flexibility as to the design of the device and an optimum of working area for the device. It is secondarily aimed at to devise routes to realise, in a rational and uncomplicated manner, transmission of movements from the base element to the moveable element.

SUMMARY OF THE INVENTION

As far as the primary aspect of the invention is concerned, the object presented is achieved by a further of the link devices being connected to another of the elements via a hinge connection which, on consideration of the device in its entirety, provide for freedom of movement between said further link device and said another of the elements in respect to at least two degrees of freedom consisting of pivotability about two different pivot axes, real or imaginary.

In this way conditions are created for a more flexible working area adaptation of the device. Furthermore, the solution defined creates possibilities to construct the device so that one of the link devices could be connected to, in the first instance, the base element via said hinge connection so that the movement of the link device at least in part becomes dependent on the movement of at least one other link device. This involves a difference relative to the device according to the U.S. Pat. No. 4,976,582 where the three link devices are functionally independent of each other.

A number of advantageous developments of the invention are defined in the dependent claims. These developments and advantages in connection with the invention are dealt with more specifically in the following description.

SHORT DESCRIPTION OF THE DRAWINGS

With reference to the enclosed drawings a more close description of embodiment examples of the invention follows here under.

In the drawings.

DETAILED DESCRIPTION OF PREFERRED EMBODIMENTS

In order to simplify the understanding, like reference characters have been used in the following in different embodiments for similar or corresponding components but with addition of letters specific to embodiments.

Figures 1, 2:
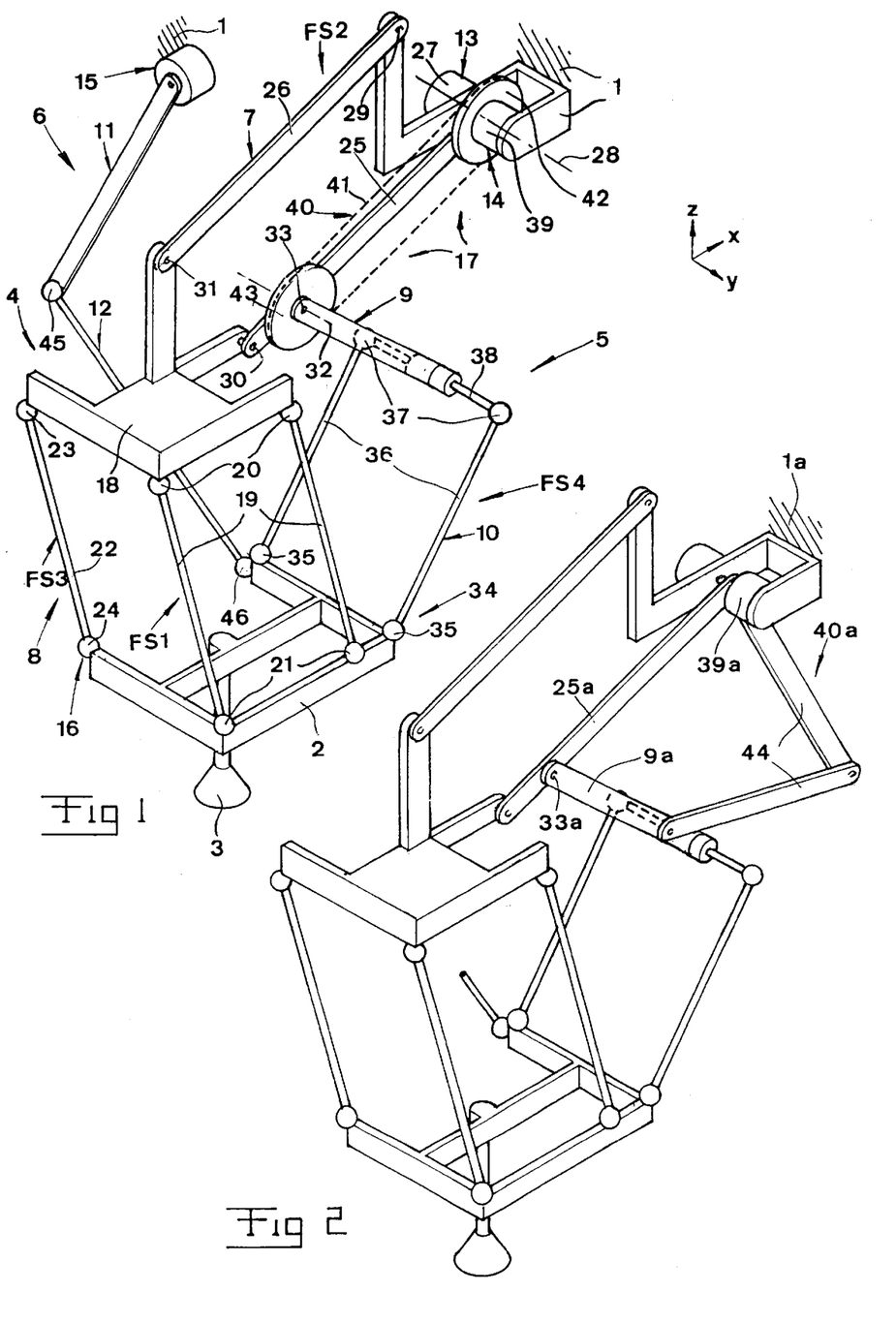
FIG. 1 is a perspective view of a robot according to the invention in a diagrammatical form.
FIG. 2 is a view similar to FIG. 1 but showing an alternative embodiment.

The robot illustrated in FIG. 1 is intended for relative displacement of two elements 1, 2. The element 1 is in this example intended to form a base element, relative to which the element 2 is intended to be positioned in space. The element 2 is intended to carry, either directly as indicated in FIG. 1, or indirectly via a carrying arrangement, a working member 3. Link devices generally denoted 4, 5 and 6 respectively are coupled between the elements 1 and 2. Each of these link devices comprises at least two mutually articulated link units. With respect to the link device 4, these link units are denoted 7 and 8 respectively. With respect to the link device 5, they are denoted 9 and 10 respectively. Finally, with respect to the link device 6, they are denoted 11 and 12 respectively.

Power exerting arrangements 13, 14, 15 are adapted to impart the respective link devices 4, 5, 6 pivoting movements for the purpose of changing the relative position between the elements 1, 2.

A first 4 of the link device is connected to the element 2 via a hinge connection generally denoted 16 so that there are, on consideration of the device in its entirety, at least two degrees of freedom in the form of relative pivotability about two pivot axes, real or imaginary, placed at an angle relative to each other between said first link device 4 and the element 2.

A further of the link devices, in the example the one denoted 5, is connected to the element 1 via a hinge connection generally denoted 17, said hinge connection providing for, on consideration of the device in its entirety, freedom of movement between said link device 5 and the element 1 as concerns at least two degrees of freedom consisting of pivotability about two different pivot axes.

With respect to the first of the link devices, namely the one denoted 4, the first link unit thereof has the character of a movement arrangement. Its second link unit 8 has, as will be explained in the following, the character of a more complex link arrangement. Between the movement arrangement 7 and the link arrangement 8 there is a connection arrangement 18 interconnecting them. The movement arrangement 7 is provided between the connection arrangement 18 and the base element 1 whereas the link arrangement 8 is provided between the connection arrangement 18 and the moveable element 2.

The link arrangement 8 comprises at least two first links 19 connected relative to the connection arrangement 18 and the moveable element 2 via joints 20, 21 to be pivotable in all directions, said first links forming, together with the connection arrangement 18 and the moveable element 21, at least one first four-links system FS1. The movement arrangement 7 is adapted to allow relative movement between the connection arrangement 18 and the base element 1.

The link arrangement 8 comprises at least one third link 22 connected relative to the connection arrangement 18 and the moveable element 2 via joints 23, 24 to be pivotable in all directions. The joints 20, 21, 23, 24 of the first and third links 19, 22 are disposed in a triangular configuration. This means, accordingly, that the joints of the links 19, 22 at a respective end of the links may not be present on a straight line.

The third link 22, each of the first links 19, the connection arrangement 18 and the moveable element 2 form a third four-links system FS3.

The first links 19 are substantially equal in length. In addition, they are substantially parallel. The first and third links 19, 22 in the link arrangement 8 are substantially equal in length. Besides, they are substantially parallel.

The movement arrangement 7 is formed by a second link arrangement comprising at least one second link 25 pivotable relative to the connection arrangement 8 and base element 1. More specifically, the link arrangement 7 comprises at least two second links 25, 26, which together with the connection arrangement 18 and the base element 1 form a second four-links system FS2. The links 25, 26 are substantially equal in length and substantially parallel. Thus, they form a parallelogram. This is pivotable in its own plane by means of the power exerting arrangement 13. This arrangement comprises a power exerting member 27 adapted to put the link 25 in a pivoting movement about an axis denoted 28. On pivoting of the link 25 about the axis 28, the link 26 will pivot about the axis 29 and furthermore, relative pivoting of the links 25, 26 and the connection arrangement 18 will occur via the axes 30, 31. In this case the joints denoted 28–30 form only one degree of freedom, i.e. a pure pivoting movement.

The link unit 9 of the second link device 5 is pivotably connected to a link contained in the second four-links system FS2 via a joint 33 forming a pivot axis 32 with one degree of pivoting, i.e. pure pivotability, relative to said link. Thus, the joint 33 will be moved together with the link on pivoting of said link. Although the joint 33 may be provided on each of the moveable links 25, 26 and the link in the four-links system FS2 formed by the connection arrangement 18 to be moved on movement of the four-link system, it is illustrated in the example that the joint 33 is arranged on the link denoted 25 and, more specifically, between the pivot axes 28, 30 thereof. The joint 33 should always be placed at a distance from the pivotable connections of the links 25, 26 to the base element 1 via the axes 28, 29. The pivot axis 32 of the joint 33 is substantially parallel to the pivot axes in the four-links system FS2.

Thus, the hinge connection 16 is formed by the joints 21 and 24. These individual joints each provide for at least two degrees of freedom in the form of pivotability about two different pivot axes. The joints 21 and 24 could be formed by ball joints, in which case also a third degree of freedom in the form of rotation could be present, or cardan joints. Corresponding considerations are valid with respect to the joints 20 and 23.

The link device 5 comprises the first link unit 9, which will be moveable relative to the base element 1 with two degrees of freedom, namely pivoting movements about the separated axes 28 and 32. This means the desirable consequence that a change in form of the four-links system FS2 will cause the link unit 9 and, accordingly, the link device 5 to accompany, a fact which simplifies control of the robot and increases the working area.

Besides, the link device 5 comprises a further link unit 10. This is connected to the moveable element via a hinge connection 34, which on consideration of the device in its entirety provides for freedom of movement between the link device 5 and the moveable element 2 with respect to at least two degrees of freedom consisting of pivotability about two different pivot axes. Also here, the hinge connection 34 may be formed by joints 35 in the form of ball joints, cardan joints etc providing for two or possibly three degrees of freedom. In the example, the link unit 10 is formed by two links 36, which via the joints 35 are connected to the moveable element 2 and via joints 37 are connected to the link unit 9. This link unit 9 is in the example formed by one single link, which at its end turned away from the joint 33 is connected to the link unit 10 via a connection providing, as viewed in the assembled state of the device, at least two degrees of freedom in the form of pivotability about two different pivot axes, real or imaginary. For instance, the joints 37 could consist of ball joints or cardan joints. In case the links 36 are connected to a cross piece 38, which in its turn is rotatably connected with one degree of freedom to the link 9, the joints 37 could consist of simple joints having a single degree of freedom involving pivotability about axes forming an angle to the axis of rotation of the cross piece 38 relative to the link 9.

The links 36 are substantially parallel and substantially equal in length and form, accordingly, a forth four-links system FS4. From the stated it appears that the link 9 in the example will pivot in parallel with the links 25, 26. Thereby the link devices 4 and 5 will be able to hold the moveable element 2 in one and the same orientation, i.e. in parallelism with the connection arrangement 18 in the entire working area.

To achieve pivoting of the link 9, a power exerting member 39 of the power exerting arrangement 14 acts on the link 9 via a transmission 40 extending from the power exerting member 39 on the base element 1 to the link 9 in the link device 5. More specifically, the transmission 40 comprises in the example a flexible traction force transmitting element 41 laid about diverting members, a first 42 of which is connected to an output axle of the power exerting member 39 formed as a rotary means so as to be prevented from rotation relative to the output axle and a second 43 of which is connected to the link 9 so as to be prevented from rotation relative thereto. Thus, by driving the rotary means 39 in opposite directions, the link 9 may be pivoted in a desired direction relative to the link 25.

The further link device 6 has in the embodiment according to FIG. 1 only the function to cause the second element 2 to move in Y-direction, i.e. in a direction substantially transversely to the plane of pivoting of the four-links system FS2.

The variant illustrated in FIG. 2 differs from the one in FIG. 1 by the link 9a here being adapted to be pivoted relative to the link 25a via a transmission 40a, which is not based upon traction force transmitting elements of a flexible type but instead comprises two links 44 articulated relative to each other, one of said links being connected to the rotor of the rotary means 39 so as to be prevented from rotation relative thereto whereas the second is pivotably connected to the link 9a. It is preferred, in both FIGS. 1 and 2, that the output axle of the rotary means 39a is concentric to the pivot axis 28 of the power exerting member 13. Otherwise the link 9a is as before pivotably articulated relative to the link 25a so that the link 9a will be moveable relative to the base element 1a with two degrees of freedom.

Figures 3, 4:
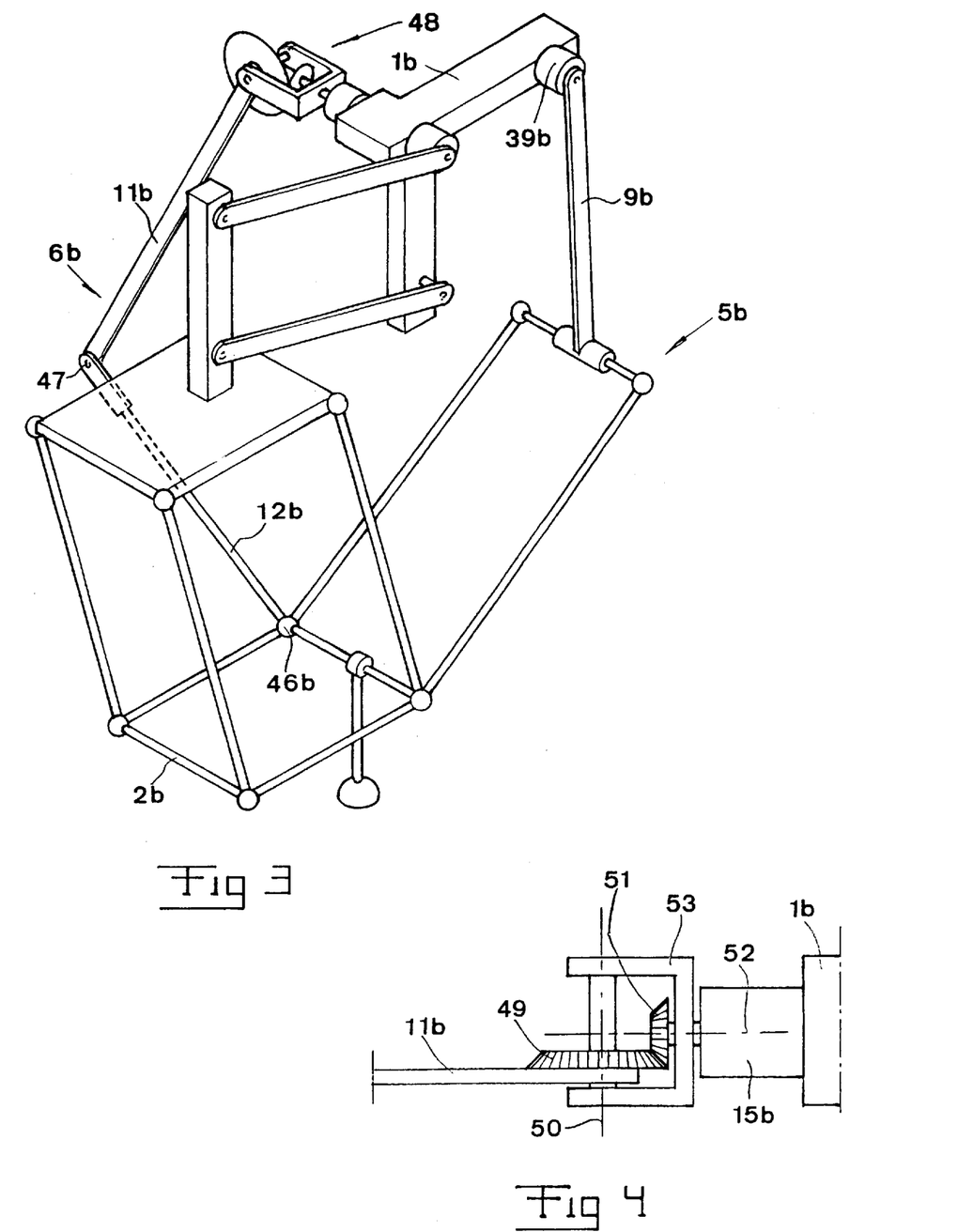
FIG. 3 is a further variant with respect to design.
FIG. 4 is a detail view showing how, in the embodiment according to FIG. 3, the device for providing pivoting of a link device may be designed.

In the variant according to FIG. 3, the link 9b of the link device 5b is no longer moveable relative to the base element 1b with two degrees of freedom but only with a single one as a consequence of the power exerting member 39b being, with a stationary portion, rigidly connected to the base element 1b and, with a moveable portion, rigidly connected to the link 9b so that the latter will move relative to the base element 1b with one single degree of freedom, which in the proceeding embodiment is formed by a pivoting movement since the power exerting member 39b here is illustrated as a rotary means, with the rotor of which the link 9b is rigidly connected.

In the embodiment according to FIG. 1, the link unit 11 of the link device 6 is moveable with one single degree of freedom in the form of a pure pivoting movement relative to the base element 1 as a consequence of the design of the power exerting arrangement 15 as a rotary means having a stator connected to the base element 1 and a rotor rigidly connected to the link unit 11 formed as one single link. The link unit 12 according to FIG. 1 has likewise the character of a single link and is with the ends thereof rigidly connected to the link 11 and to the moveable element 2 via hinge connections 45 and 46 respectively allowing at least two degrees of freedom in the form of pivoting about axes placed at an angle relative to each other, which may be realised by the joints 45, 46 being formed as ball joints, in which case three degrees of freedom are present as a consequence of the additional possibilities to rotation, or cardan joints.

In the variant according to FIG. 3, there is the difference that the links 11b and 12b are mutually connected via a hinge connection 47 allowing one single degree of freedom in the form of pivoting between the links. On the contrary, the link 11b is moveable, via a hinge connection generally denoted 48, with two degrees of freedom relative to the base element 1b in contrast to the preceding embodiment. As concerns the link 12b, the same is, however, connected to the moveable element 2b via a joint 46b which here must present three degrees of freedom, namely two degrees of freedom in the form of pivoting about axes placed at an angle to each other and a further degree of freedom in the form of rotation about the longitudinal axis of the link 12b.

FIG. 4 illustrates more specifically in a detail view from above of the hinge connection 48 per se that the link 11b is rigidly connected to a gear wheel 49 comprised in an angular gear. The link 11b is pivotably supported relative to the base element 1b about a first axis 50. The gear wheel 49 is in engagement with a second gear wheel 51, which is connected to a rotor of the power exerting arrangement 15b so as to be prevented from rotation relative to said rotor, the power exerting arrangement being formed as a rotary means having a stator connected to the base element 1b and a rotor connected to the gear wheel 51. Said rotor has the character of an output axle. The link 11b is pivotable relative to the base element 1b about a second axis 52 extending at an angle, in particular a substantially right angle, to the first mentioned axis 50. Said pivotability about the axis 52 is formed by a yoke 53 being rotatably supported about the output axis of the rotary means 15b and this yoke 53 carries in its turn the axis, around which the link 11b is pivotable.

The embodiment according to FIGS. 3 and 4 has the advantage that when the moveable element 2b is moved in the direction x by the link device 5b, the link device 6b will accompany while being inclined as a consequence of rotation about the axis 52. This means that the link device 6b always will have a favourable orientation for executing control forces on the moveable element 2b.

Figure 5:
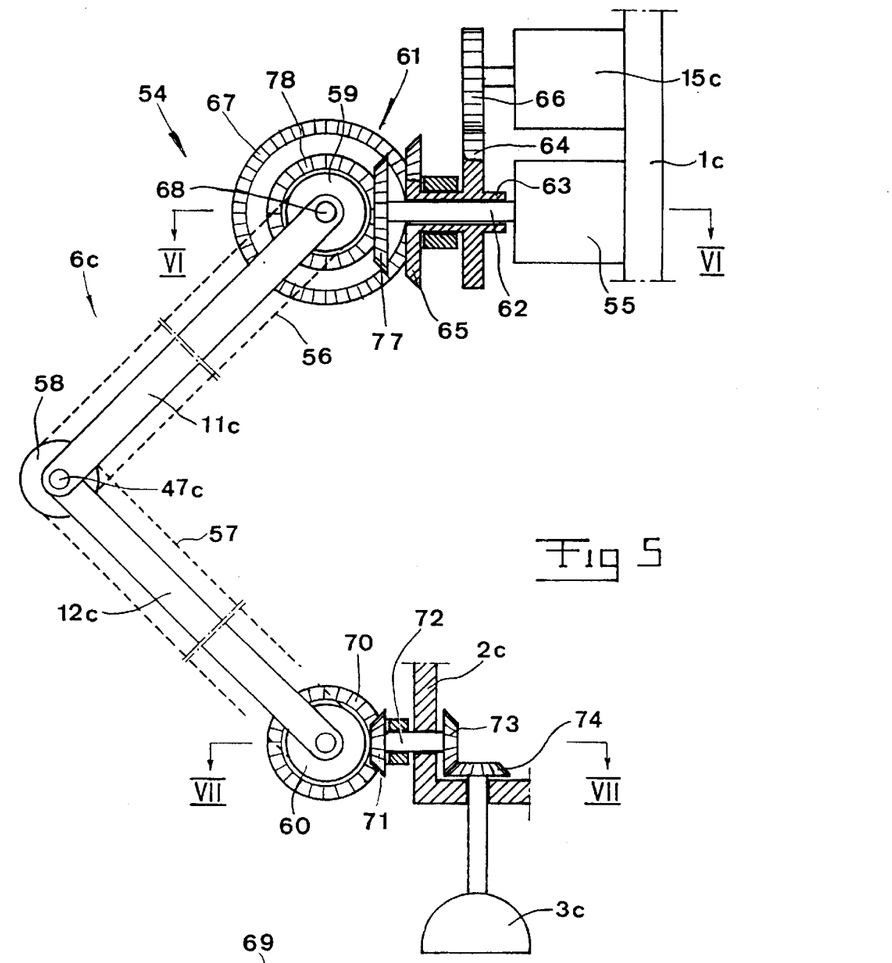
FIG. 5 is a partially cut, diagrammatical side view illustrating that a transmission for putting a working member on the moveable element in movement, here in rotation, may be incorporated into a link device extending between the two elements.
Figures 6, 7:
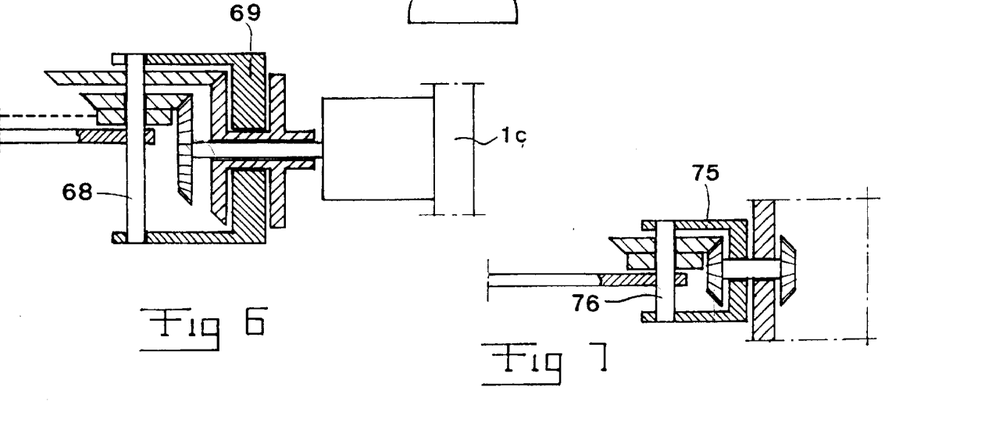
FIG. 6 is a detail view according to the section VI—VI in FIG. 5.
FIG. 7 is a section along the line VII—VII in FIG. 5.

FIGS. 5–7 illustrate a link device 6c corresponding to the one denoted 6b in FIG. 3. As in the preceding embodiment, this link device comprises links 11c, 12c. Along this link device there is provided a transmission generally designated 54 for transmitting driving power between a power exerting member 55 arranged on the base element 1c and a working member 3c arranged on the moveable element 2c. More specifically, the transmission 54 is adapted to rotate the working member 3c, e.g. about its own axis. The transmission 54 comprises traction force transmitting elements 56, 57 laid around diverting members 58, 59, 60 disposed at the articulated connection 47c of the links 11c and 12c and at the ends of the links 11c and 12c turned away from the connection 47c. The diverting member 59 on the link 11c is drivingly connected, via an angular gear 61, to an output drive axle 62 from the power exerting member 55. Around this device axle 62 there is arranged a tubular axle 63, with which gear wheels 64 and 65 respectively are rigidly connected. The gear wheel 64 is in driving engagement with a gear wheel 66 placed on an output axle from the power exerting member 15c in the form of a rotary means. The gear wheel 65 is included in an angular gear together with a further gear wheel 67, which is connected to the link 11c so as to be prevented from rotation relative thereto. When the rotary means 15c is operated, the tubular axle 63 will, via the gear wheels 66 and 64, rotate about the axle 62 and this puts, via the gear wheel 65, the gear wheel 67 rigidly connected to the link 11c in rotation about an axle 68. This axle is arranged in an attachment 69 which is rotatably supported about an axis parallel to the axle 62 and the tubular axle 63, more specifically by the attachment 69 being rotatably supported about a portion of the tubular axle 63. This means that the link 11c will be able to pivot relative to the base element 1c about the axle 68 and an axle perpendicular in relation to this axle 68 and concentric to the axle 62. Thus, there are two degrees of freedom for the link 11c in accordance with the preceding embodiment.

At that end of the link 12c which is closest to the moveable element 2c, a gear wheel 70 is connected to the diverting member 60 so as to be prevented from rotation relative thereto, said gear wheel 70 being included in an angular gear since it is in engagement with a further gear wheel 71, which is rigidly connected to an axle 72, to which also a further gear wheel 73 is connected. This gear wheel 73 is contained in a further angular gear since it is in engagement with the gear wheel 74, which is connected to the working member 3c so as to be prevented from rotation relative thereto.

It appears from FIG. 7 that a yoke like attachment 75 operates as a carrier for an axle 76, around which the link 12c is pivotable relative to the moveable element 2c. This attachment 75 is in its turn pivotably arranged around an axis extending at an angle, preferably a substantially right angle, to the axle 76, in the example the axle denoted 72 and carrying the gear wheels 71 and 73. Thus, there are between the link 12c and the moveable element 2c two degrees of freedom in the form of pivotability around double pivoting axes relative to the moveable element 2c, said pivoting axes extending at an angle to each other. On operation of the rotary means 55, the axle 62 and the gear wheel 77 placed thereon and comprised in the angular gear 61 will be put into rotation and this causes rotation of the gear wheel 78 rigidly connected to the diverting member 59. Thus, this causes the traction force transmitting element 56 to be driven around, a fact which puts the diverting member 58 in rotation. This is in engagement with the traction force transmitting element 57, which means that also the diverting member 60 and the gear wheel 70 rigidly connected thereto are put into rotation. This rotation is, via the angular gears 70/71 and 73/74, transferred into rotation of the working member 3c.

The embodiment according to FIGS. 5–7 has the advantage that both power members 55 and 15c for pivoting the working member and pivoting the link device 6c may be disposed on the base element 1c so that a minimum of mass inertia is achieved.

Figure 8:
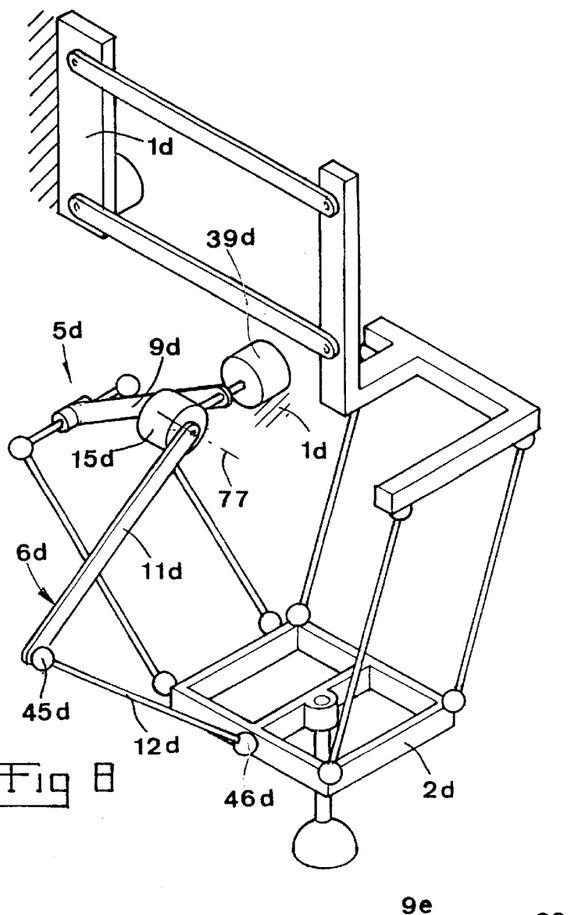
FIG. 8 is a view of a further variant with respect to the basic design of the robot.

FIG. 8 illustrates a variant where the link device 5d as in the embodiment according to FIG. 3 has a link 9d, which is put into motion, by means of the power exerting member 39d, in a movement with only one degree of freedom, namely a pure pivoting movement. A power exerting member 15d serves for putting the link 11d of the link device 6d into a pivoting movement about an axle 77. The movement of the link 11d relative to the power exerting member 15d occurs with one single degree of freedom. However, the power exerting member 15d is in this case adapted to be put into a rotational movement of the power exerting member 39d belonging to the link device 5d in that a base of the power exerting member 15d is connected to the output axle of the power member 39d. Said output axle from the power member 39d extends substantially perpendicularly relative to the axis 77. Thus, the link 11d will be moveable relative to the base element 1d with two degrees of freedom, i.e. pivoting movements around double pivot axes inclined relative to each other. This means that when the link 9d is pivoted by means of the power member 39d, the power member 15d and then also the link 11d will accompany. The joint 45d between the links 11d and 12d as well as the joint 46d between the link 12d and the moveable element 2d are designed to allow at least two degrees of freedom in the form of pivoting around axes placed at an angle to each other. The embodiment according to FIG. 8 makes it possible to rationally provide a transmission extending along the links 11d and 12d to cause the working member 3d to rotate. This transmission may for instance be based on use of axles and cardan joints.

Figure 9:
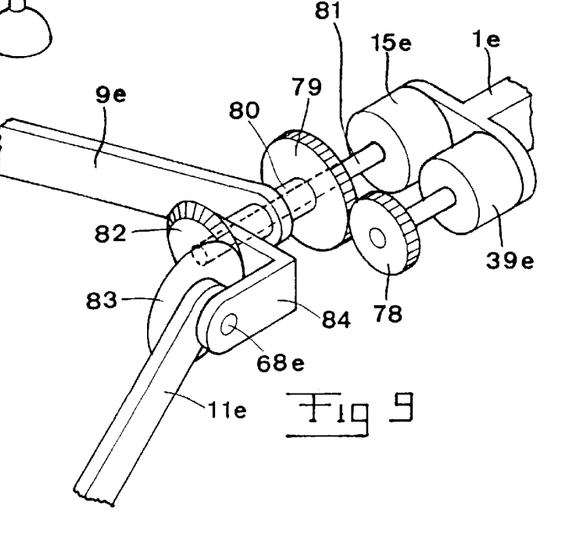
FIG. 9 shows a driving arrangement forming an alternative to the one illustrated in FIG. 8.

FIG. 9 illustrates a variant of the embodiment according to FIG. 8. According to this variant, both of the power exerting members 15e and 39e will be capable of being arranged on the base element 1e so that the mass inertia becomes minimal. More specifically, the power exerting member 39e acts on the link 9e by an output axle from the power member comprising a gear wheel 78 in engagement with a gear wheel 79 rigidly connected to an axle 80, to which also the link 9e is rigidly connected. The axle 80 is designed as a tubular axle and receives an axle 81, which is in driving connection with the power exerting member 15e. A gear wheel 82 is connected to the axle 81 so as to be prevented from rotation relative thereto and this gear wheel 82 as well as a further gear wheel 83 rigidly connected to the link 11e forming an angular gear to subject the link 11e to pivoting movement around an axle 68e. An attachment 84 carries the axle 68e and is connected to the tubular axle 80 so as to be prevented from rotation relative thereto in order to be put into a rotation about the axle 81 together with the tubular axle 80 by means of the power exerting member 39e. As in the embodiment according to FIG. 8, link 11e will accompany on pivoting of the link 9e.

Figure 10:
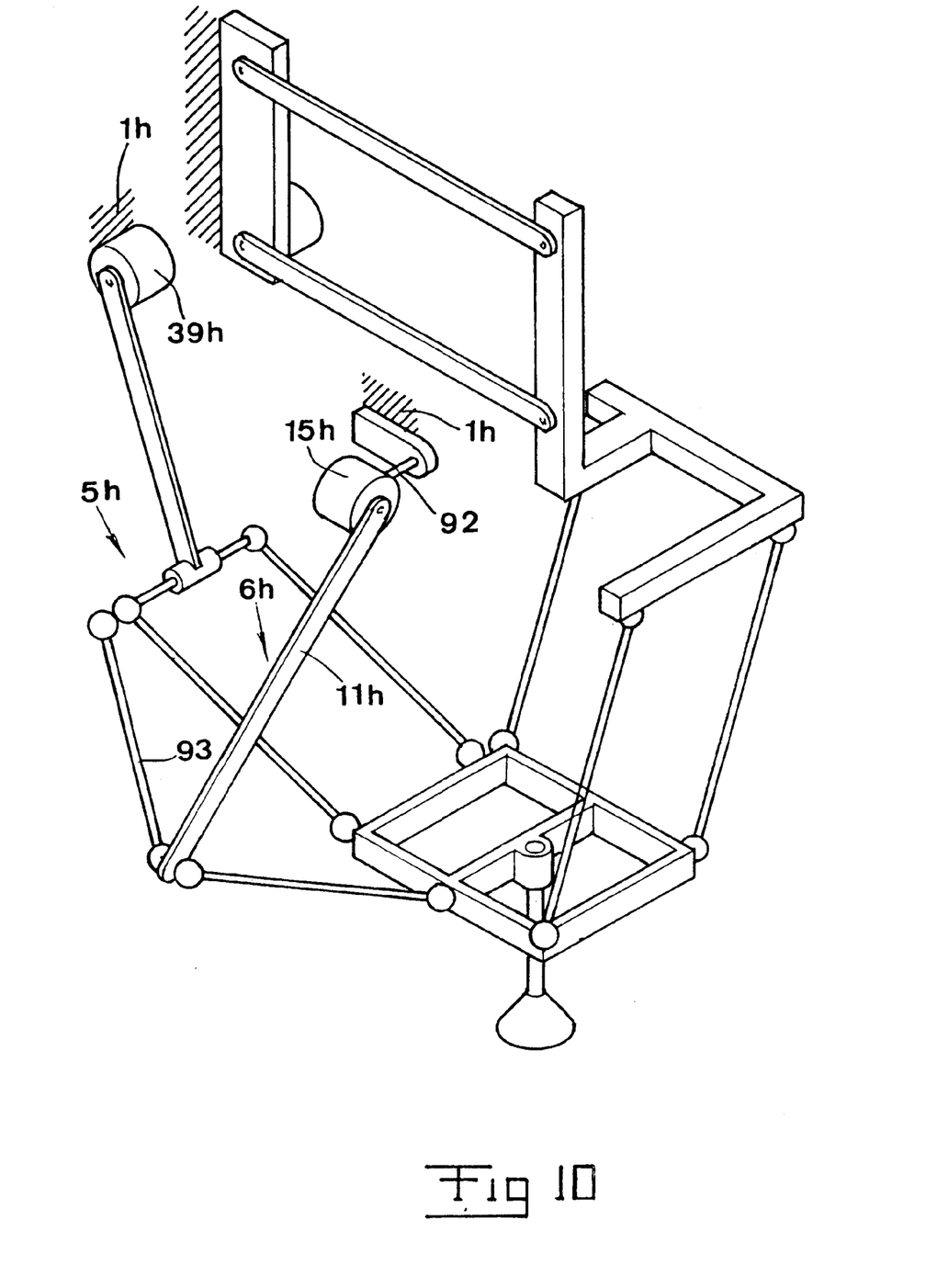
FIG. 10 shows, in perspective, a further robot alternative.

FIG. 10 illustrates a variant deviating from the one in FIG. 8 by the power member 39h here having a stationary portion secured to the base element 1h without any direct connection to the power exerting member 39h for the link device 6h. Instead, the power member 15h is here rotatably supported with a base portion relative to the base element 1h about an axle 92. A moveable portion of the power member 15h is rigidly connected to the link 11h. Accordingly, the link 11h will be moveable relative to the stationary portion of the power member 15h with one single degree of freedom, namely pure pivoting, whereas the power member 15h will be moveable relative to the base element 1h with a further degree of freedom, namely pure pivoting, and this more specifically about an axis extending at an angle to the pivot axis of the link 11h relative to the base portion of the power member 15h. The effect of this is that the link 11h will be moveable relative to the base element 1h with two degrees of freedom. When the link device 5h is pivoted with assistance of the power member 39h, the link device 6h will be able to accompany by the base portion of the power member 15h rotating about the axle 92. The interconnection between the link device 5h and 6h in this regard occurs by means of a connection link 93, which connects, by means of hinge connections having at least two degrees of freedom, i.e. pivoting about axles angled relative to each other, the link devices. For the rest, the embodiment is as previously described.

Figure 11:
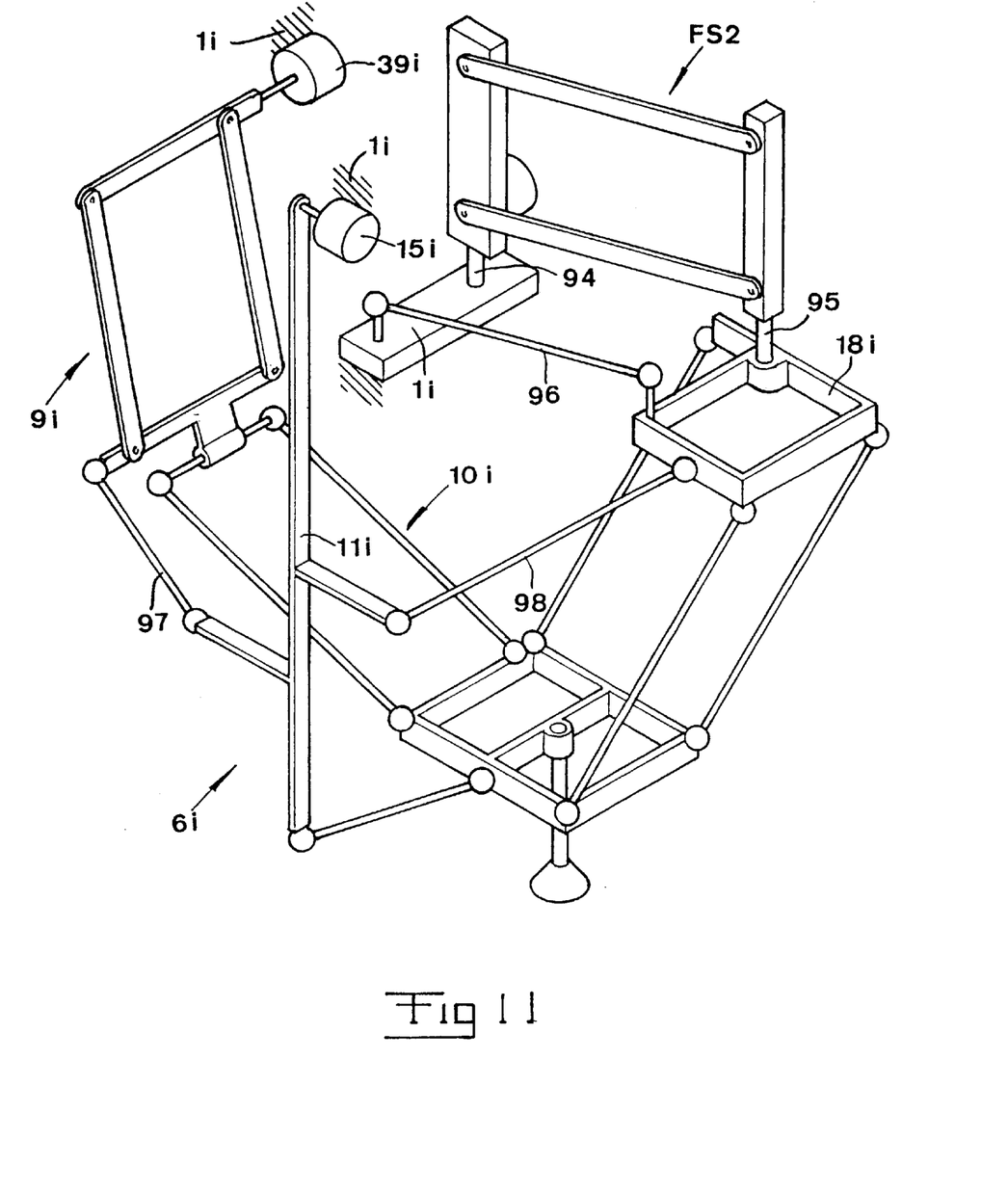
FIG. 11 shows, in a view similar to the one in FIG. 10, a robot embodiment of a somewhat more complex nature then the one in FIG. 10.

FIG. 11 illustrates a variant of the embodiment according to FIG. 10. The difference is a.o. that the four-links system FS2 has been arranged pivotable about an axle 94 relative to the base element 1*i*. Between the four-links system FS2 and the connection arrangement 18*i* there is also rotatability about an axle 95. The axles 94, 95 are substantially parallel to each other. In order to maintain the orientation of the connection arrangement 18*i* relative to the base element 1*i*, there is between the base element and the connection arrangement 18*i* a further link 96, which forms, with the four-links system FS2, a further four-links system, which on pivoting of the four-links system FS2 will maintain the orientation of the connection arrangement 18*i* relative to the base element 1*i*. The further link 96 must be connected to the base element 1*i* and the connection arrangement 18*i*, via joints having at least two degrees of freedom. In contrast to the preceding embodiment, the power exerting member 15*i* is here arranged directly on the base element 1*i* so that the link 11*i* will describe a movement having only one degree of freedom relative to the base element 1*i*, namely in the example pure pivoting. In the embodiment according to FIG. 11, the individual link 9 in the preceding embodiment has been replaced with a link unit 9*i* forming a four-links system. This four-links system is, by means of the power member 39*i*, pivotable relative to the base element 1*i* in a plane of pivoting orientated substantially perpendicularly to planes, in which the four-links system 9*i* is possible to change as to form. The four-links system 9*i* is then connected to the link unit 10*i* which also is designed as a four-links system. In this case there are between the link 11*i* in the link device 6*i* and the connection arrangement 18*i* and the four-links system 9*i* links 97 and 98 respectively, which cause the connection arrangement 18*i* and the four-links system 9*i* to be able to accompany when the link 11*i* is pivoted by means of the power member 15*i*.

Figure 12:
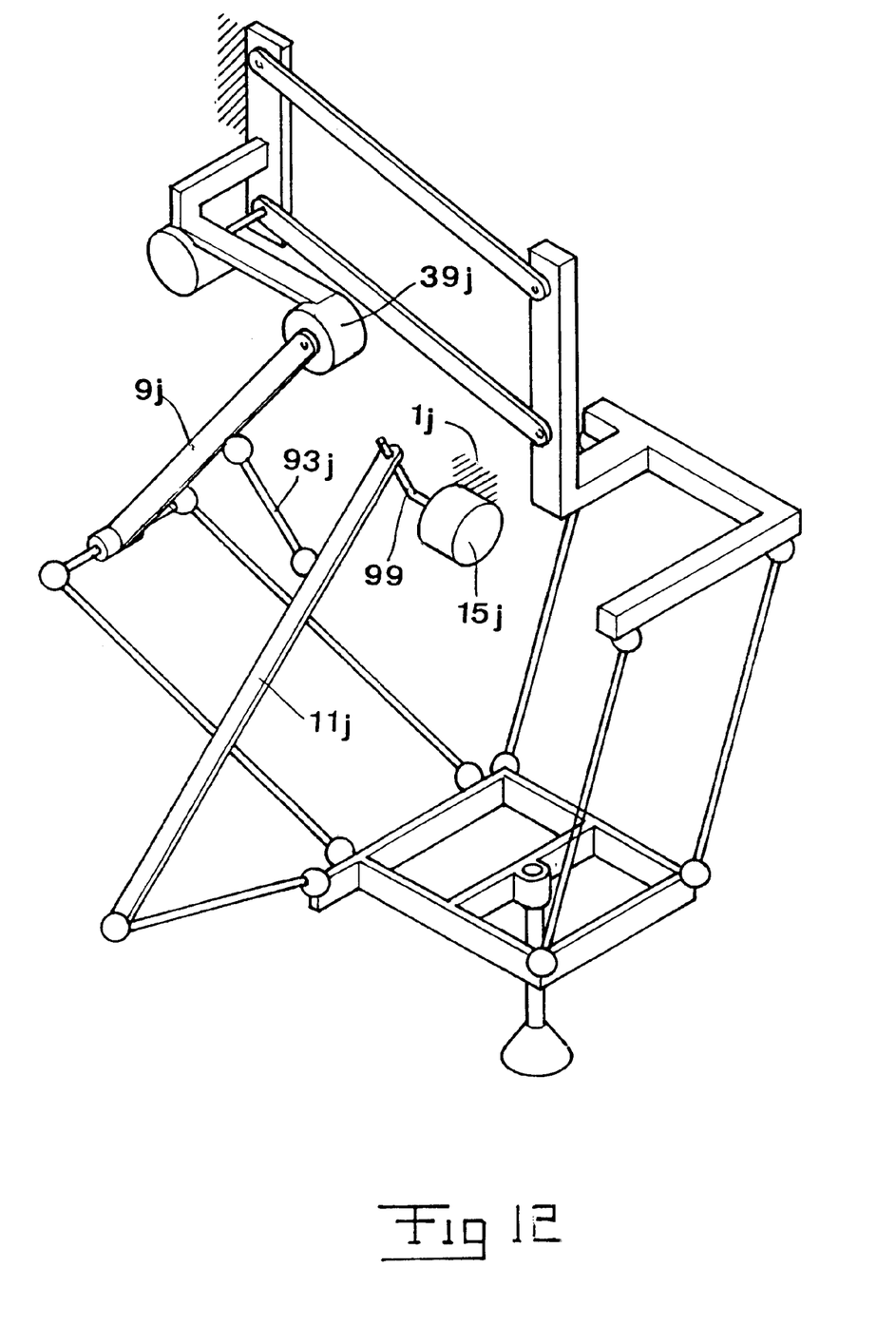
FIG. 12 is a perspective view of a further design variant.

The variant according to FIG. 12 is in reality equivalent to the one in FIG. 10. However, the link 93*j* is here coupled between the links 9*j* and 11*j* respectively whereas the power member 15*j* is provided on the base element 1*j*. A moveable portion of the power member 15*j* is connected to the link 11*j* to pivot the same. This moveable portion denoted 99 is, however, rotatably coordinated with the link 11*j* so that when the link 9*j* is pivoted by means of the power member 39*j*, the link 11*j* will be able to accompany freely in pivoting movements substantially parallel to the pivot axis for the movable portion 99 but when the power member 15*j* is activated, the moveable portion 99 thereof will, on rotation, force the link 11*j* to accompany. However, there is also here as appears from the description, a freedom of movement between the link 11*j* and the base element 1*j* having regard to two degrees of freedom, namely pivotability about double pivot axes angled relative to each other.

Figure 13:
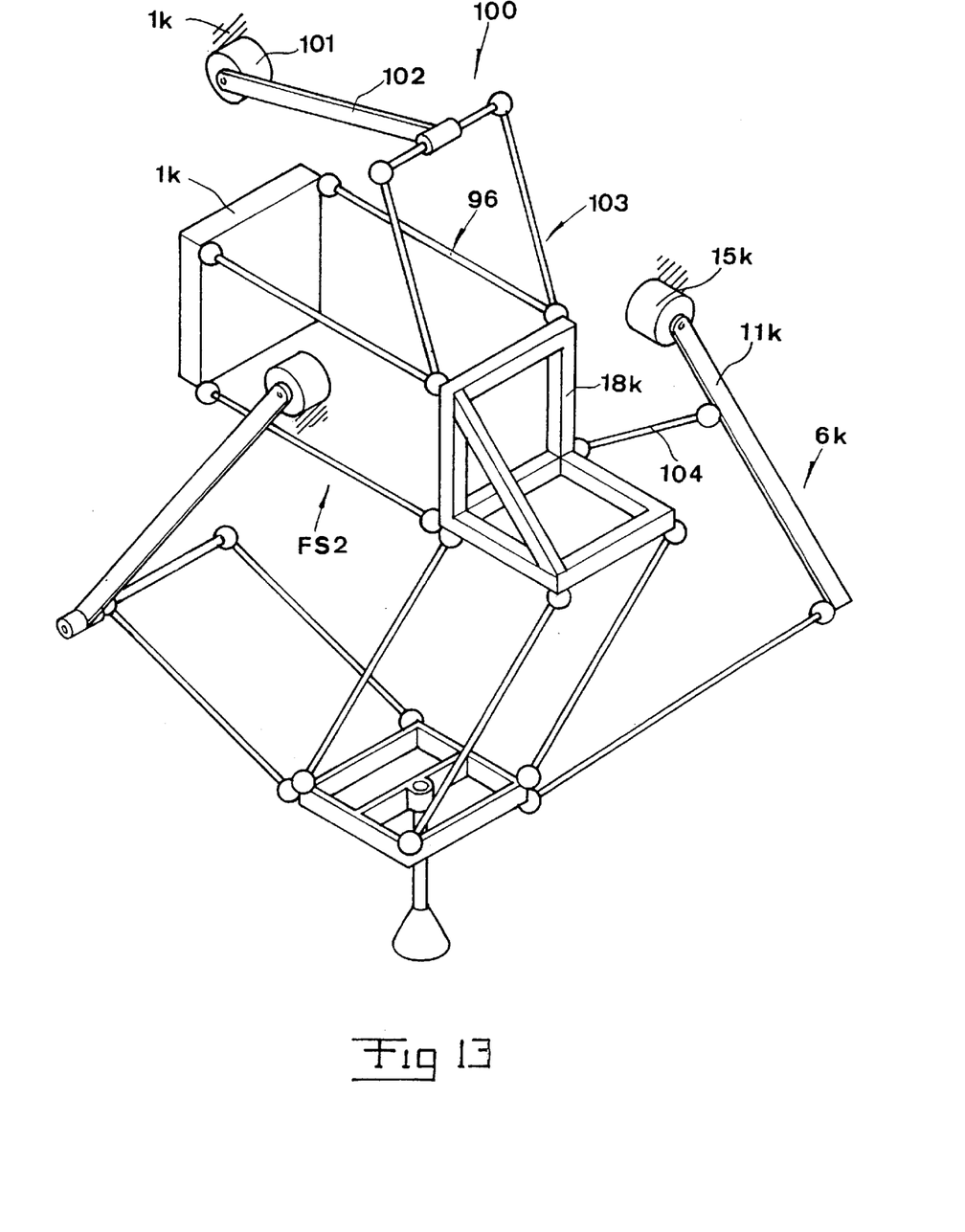
FIG. 13 is a perspective view of a further robot alternative.

The variant according to FIG. 13 differs mainly from the one in FIG. 11 by FS2 and the further link 96 being operated in altitude by means of a further link device 100, which operates as a power intermediary between a power exerting member 101 and the connection arrangement 18*k*. The link device 100 comprises a link arm 102 which is moveable with one single degree of freedom, in the example pure pivoting, relative to the base element 1*k* and which via four-links system 103 similar to the one previously denoted 10 is connected to the connection arrangement 18*k*. The four-links system 103 could also engage on links forming a connection between the base element 1*k* and the connection arrangement 18*k*. Between the connection arrangement 18*k* and the link 11*k* in the link device 6*k* there is a connection 104 connecting together the pivoting movement of the link 11*k* with the connection arrangement 18*k* so that the later is displaced when the link 11*k* is pivoted.

Figure 14:
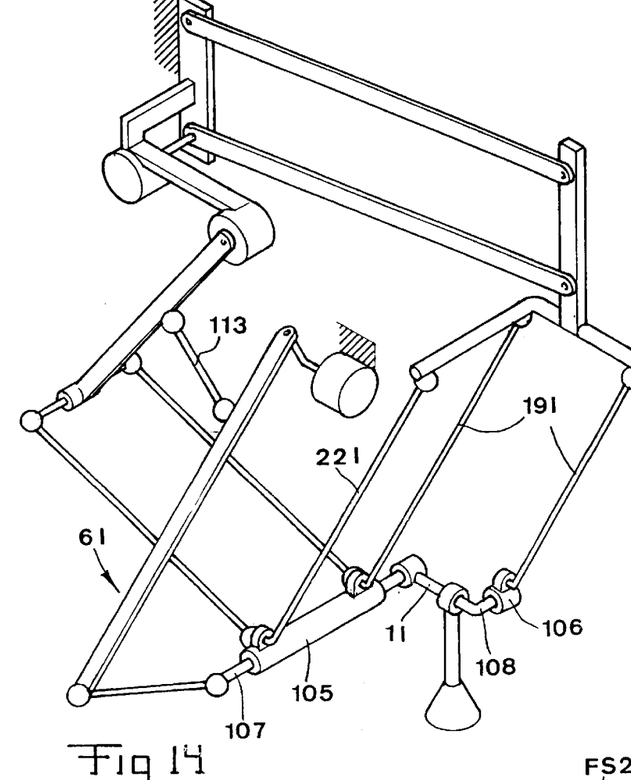
FIG. 14 is a view illustrating another design with regard to the connection of the link devices to the moveable element.

The variant in FIG. 14 corresponds substantially to what has been described earlier with the exception that the links 191 and 221 here are connected to sleeves 105 and 106 respectively via joints having one single degree of freedom, namely in the embodiment freedom to pivot about one single axis. These sleeves 105, 106 are in their turn rotatably journalled about axles 107 and 108 respectively. The axle 108 is conceived to form a constituent of the moveable member 11, at which the working member 31 is arranged. The moveable member 11 is rotatably journalled around the axle 107. The link device 61 acts on the axle 107 in a manner which in principle already has been described. The purpose of the embodiment according to FIG. 14 is most closely to demonstrate that many variants are possible when it comes to realise the hinge connection between the links and other constituents contained in the robot structures. The applications in question are, accordingly, only restricted by the definitions appearing from the appendant patent claims.

Figure 15:
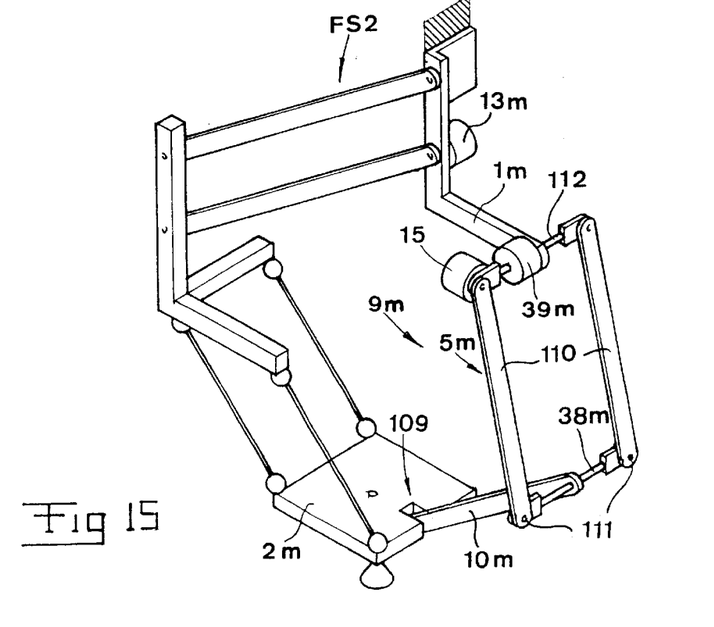
FIG. 15 is a perspective view illustrating an embodiment according to the invention having only two link devices.

FIG. 15 illustrates a variant deviating from the one in FIG. 1 in the sense that here the link devices 5 and 6 present in FIG. 1 have been replaced by one single link device 5*m*. This is coupled, with a first link unit 10*m*, to the moveable element 2*m* via a connection 109 comprising one single degree of freedom, namely pivoting about one single axis. In the example it is illustrated that the link unit 10*m* comprises only one single link. It should be understood that two or more links may be arranged in parallel to improve stability if this would be desired.

The link device 5*m* comprises, furthermore, a link unit 9*m* which is connected to the link unit 10*m* with two degrees of freedom, i.e. in the example pivoting about double axes placed at an angle relative to each other. Although said two degrees of freedom may be realised with cardan joints or similar, a cross piece 38*m* as in FIG. 15 may also be moveable with one degree of freedom relative to the link 10*m*, i.e. by pure rotation whereas this cross piece then is connected to the two links 110 comprised in the link unit 9*m* via joints 111 also comprising one single degree of freedom, i.e. pure pivotability but this about axes which are angled relative to the axis, around which the cross piece 38 is pivotable relative to the link 10*m*.

The links 110 are then also connected to the base element 1*m* via two degrees of freedom. More specifically, a cross piece 112 is in the example rotatably supported relative to the base element 1*m* with one single degree of freedom and then the links 110 are hingedly connected to this cross piece 112 also with one single degree of freedom, namely pure pivoting. The pivoting of the links 110 relative to the cross piece 112 occurs around axles placed at an angle relative to the axis of rotation of the cross piece 112 relative to the base element 1*m*.

It should be observed that it is essential in the embodiment according to FIG. 15 that the parallelogram formed by the links 110 and the cross pieces 38*m* and 112 is rigid to rotation, i.e. that the cross pieces 112 and 38*m* comprised in the parallelograms are maintained substantial parallel, the link 10*m* between the moveable element 2*m* and the cross piece 38*m* also being allowed to have one single degree of freedom in the form of pure pivotability in order to achieve stabilisation of the moveable element 2*m*.

Furthermore, it is pointed out that the four-links system FS2 also must be secured against rotation, i.e. adapted to be able to change its form in substantially one and the same plane.

In order to operate FS2, there is as before a power exerting arrangement 13m. In order to execute required control via the link device 5m, a power exerting member 39m is adapted to pivot the cross piece 112 and in this way pivot the links 110 relative to the base element 1m whereas a further power exerting member 15m is adapted to pivot the links 110 relative to the cross piece 112 in planes substantially parallel to the axis of rotation of the cross piece 112. It is illustrated in the example that the power exerting member 39m has a stationary portion connected to the base element 1m and a moveable portion connected to the cross piece 112. The power exerting member 15m is, in the example, illustrated as comprising a stationary portion rigidly connected to the cross piece 112 whereas a moveable portion of the power exerting member is connected to one of the links 110. Expressed in other words, the links 110 may be operated in two planes substantially perpendicular to each other by means of the power members 39m and 15m.

Common to all described embodiments is that a suitable control unit, particularly in the form of a computer, is adapted to control the power exerting members of the various robot embodiments for the purpose of causing the second element 2 or members coupled thereto directly or indirectly to move in desired paths.

POSSIBLE MODIFICATIONS

It is evident that the invention is not only restricted to the embodiments discussed herein above. Thus, detail adaptations of the embodiments may be carried out depending on the circumstances without leaving the inventive concept appearing from claim 1.

What is claimed is:

1. A device for relative movement of two elements comprising:
    a first element forming a base element;
    a second element movable with respect to the first element;
    at least two link devices coupled between the first and second elements, each of said link devices comprising at least two mutually articulated link units;
    plural power exerting arrangements provided to impart to the link devices pivoting movements which change a relative position of the elements;
    a first of the link devices being connected to one element of the first and second elements via a hinge connection so that there are, between said first link device and said one element, at least two degrees of freedom in the form of relative pivotability about two pivot axes forming an angle relative to each other;
    wherein said first link device is movable relative to another element of the first and second elements with one single degree of freedom;
    wherein a further link device is connected to said other element of the first and second elements via a hinge connection which provides freedom of movement between said further link device and said other element of the first and second elements including at least two degrees of freedom consisting of pivotability about two different pivot axes.

2. A device according to claim 1, wherein the first of the link devices comprises:
    a link arrangement,
    a movement arrangement,
    and a connection arrangement interconnecting the link arrangement and the movement arrangement,
    the movement arrangement being provided between the connection arrangement and one of the first and second elements,
    wherein the link arrangement is arranged between the connection arrangement and the other element of the first and second elements.

3. A device according to claim 2, wherein the link arrangement comprises at least two first links connected via joints relative to the connection arrangement and an associated one of the first and second elements to be pivotable in all directions,
    said first links forming, together with the connection arrangement and the associated elements, at least one first four-links system,
    the movement arrangement being adapted to allow relative movement between the connection arrangement and the associated elements.

4. A device according to claim 3, wherein the power exerting arrangements are adapted to actuate the link arrangement and the movement arrangement so as to change a relative position of the first and second elements.

5. A device according to claim 3, wherein the link arrangement comprises at least one third link connected via a plurality of joints relative to the connection arrangement and the associated one of the first and second elements to be pivotable in all directions,
    wherein the plurality of joints of the first and third links are disposed in a triangular configuration.

6. A device according to claim 5, wherein the at least one third link, each of the first links, the connection arrangement and the associated one of the first and second elements form a third four-links system.

7. A device according to claim 3, wherein the first links in the link arrangement are substantially equal in length.

8. A device according to claim 3, wherein the first links in the link arrangement are substantially parallel.

9. A device according to claim 2, wherein the movement arrangement is formed by a second link arrangement comprising at least one second link pivotable relative to the connection arrangement and an associated one of the first and second elements.

10. A device according to claim 9, wherein the second link arrangement comprises at least two second links, which together with the connection arrangement and the associated one of the first and second elements, form a second four-links system.

11. A device according to claim 10, wherein the second links in the second link arrangement are substantially equal in length.

12. A device according to claim 11, wherein the second links in the second link arrangement are substantially parallel.

13. A device according to claim 3, wherein the first and third links in the first link arrangement are substantially equal in length.

14. A device according to claim 13, wherein the first and third links in the first link arrangement are substantially parallel.

15. A device according to claim 1, wherein the further link device is connected to another of the link devices by connection means for accompanying said another of the link devices in a movement thereof resulting from the power exerting arrangement.

16. A device according to claim 15, wherein the further link device is hingedly connected to a moveable part arranged in said another of the link devices.

17. A device according to claim 16, wherein the moveable part is pivotable.

18. A device according to claim 16, wherein a power exerting arrangement associated with the further link device is adapted to cause a link unit arranged in the further link device to pivot relative to the moveable part.

19. A device according to claim 10, wherein the further link device is pivotably connected at an end to a moveable link arranged in the second four-links system.

20. A device according to claim 19, wherein the further link device is pivotably connected to the link of the second four-links system about a pivot axis which is substantially parallel to a pivot axis of said link of the second four-links system relative to the associated one of the first and second elements.

21. A device according to claim 17, wherein the further link device comprises at least one first link pivotably connected to said link of the second four-links system, and at least one second link connected to the second of the first and second elements in a pivotable manner.

22. A device according to claim 21, wherein a power exerting arrangement pivots the first link in the second link device relative to the link of the second four-links system, said power exerting arrangement including a power exerting member arranged on one of the first and second elements to which the link of the second four-links system is pivotably connected.

23. A device according to claim 22, wherein said power exerting member acts on the first link of the further link device via a transmission comprising power transmission members extending along the link of the second four-links system.

24. A device according to claim 22, wherein the power exerting member acts on the first link of the further link device via a link arm system comprising at least two articulated links.

25. A device according to claim 1, wherein the further link device is connected to both of the first and second elements via hinge connections which allow relative movement with two degrees of freedom between said further link device and each of the elements.

26. A device according to claim 25, wherein links arranged in the further link device are hingedly connected to each other via a hinge connection allowing one single degree of freedom of movement in the form of pivoting between the links.

27. A device according to claim 25, wherein the power exerting arrangement causes the further link device to pivot relative to the first and second elements comprises a power exerting member arranged on one of the first and second elements as a rotary means for transmitting drive power which, via an angular gear comprising a gear wheel rigidly connected to one of the links in the second link device, transmits drive power to said link,
wherein said link is freely pivotable about an axis substantially parallel to the axis of rotation of the rotary means.

28. A device according to claim 25, wherein a transmission for driving power transmission between a power exerting member arranged on one of the first and second elements, and a working member arranged on the other of the first and second elements, is provided along the further link device.

29. A device according to claim 28, wherein the transmission comprises traction force transmitting elements arranged about diverting members and rotatably provided at an articulated connection of the links of the further link device, and at an end of at least one of the links which is turned away from the articulated connection, wherein a diverting member present at one of the ends, which are turned away from each other, of the links comprising the further link device is drivingly coupled, via an angular gear, to one of the power exerting member and a working member.

30. A device according to claim 29, wherein the power exerting member which causes one of the diverting members to rotate in a rotary means for rotating having an axle on which a first gear wheel is drivingly engaged with a second gear wheel connected to the diverting member,
said first and second gear wheels forming an angular gear,
wherein a tubular axis is arranged about said axle and provided with means for driving, via the power exerting member arranged to pivot the second link device and a third gear wheel in engagement with fourth gear wheel rigidly connected to the adjacent link of the further link device, said third and fourth gear wheels forming said angular gear.

31. A device according to claim 23, wherein the power transmission members comprise at least one flexible traction force transmitting element and diverting members, about which the transmitting element is, arranged within the power exerting member is adapted to rotate one of the diverting members, whereas a second of the diverting members is rigidly connected to the second link of the further link device.

32. A device according to claim 1, wherein the further link device is connected to the first of the first and second elements with at least three degrees of freedom of movement.

33. A device according to claim 1, further comprising two further link devices,
wherein these further link devices each comprise a moveable first link moved by another power exerting arrangement,
wherein the moveable link of one of the further link devices is arranged to accompany the moveable first link of a remaining one of the further link devices in a movement involving one further degree of freedom.

34. A device according to claim 2, wherein the movement arrangement is connected to the base element with connections providing two degrees of freedom.

35. A device according to claim 3, wherein the at least one first four-links system is rotatably connected to the base element about an axis substantially parallel to a pivoting plane of the at least one four-links system,
wherein a further link of the movement arrangement connects to a further four-links system operating in parallel said further link controlling the connection arrangement.

36. A device according to claim 1, wherein the first link unit of the further link device is connected to the base element via a connection providing two degrees of freedom,
wherein the second link unit is connected to the moveable element via a connection having one degree of freedom only,
wherein the first and second link units are interconnected via a connection providing two degrees of freedom.

37. A device according to claim 1, further comprising an industrial rotor, wherein the second element of the first and second elements carries, directly or indirectly, at least one working member.

* * * * *